Feb. 25, 1941. P. F. SPERRY 2,232,811
PROJECTOR AND GATE MECHANISM THEREFOR
Filed Aug. 4, 1939 4 Sheets-Sheet 3
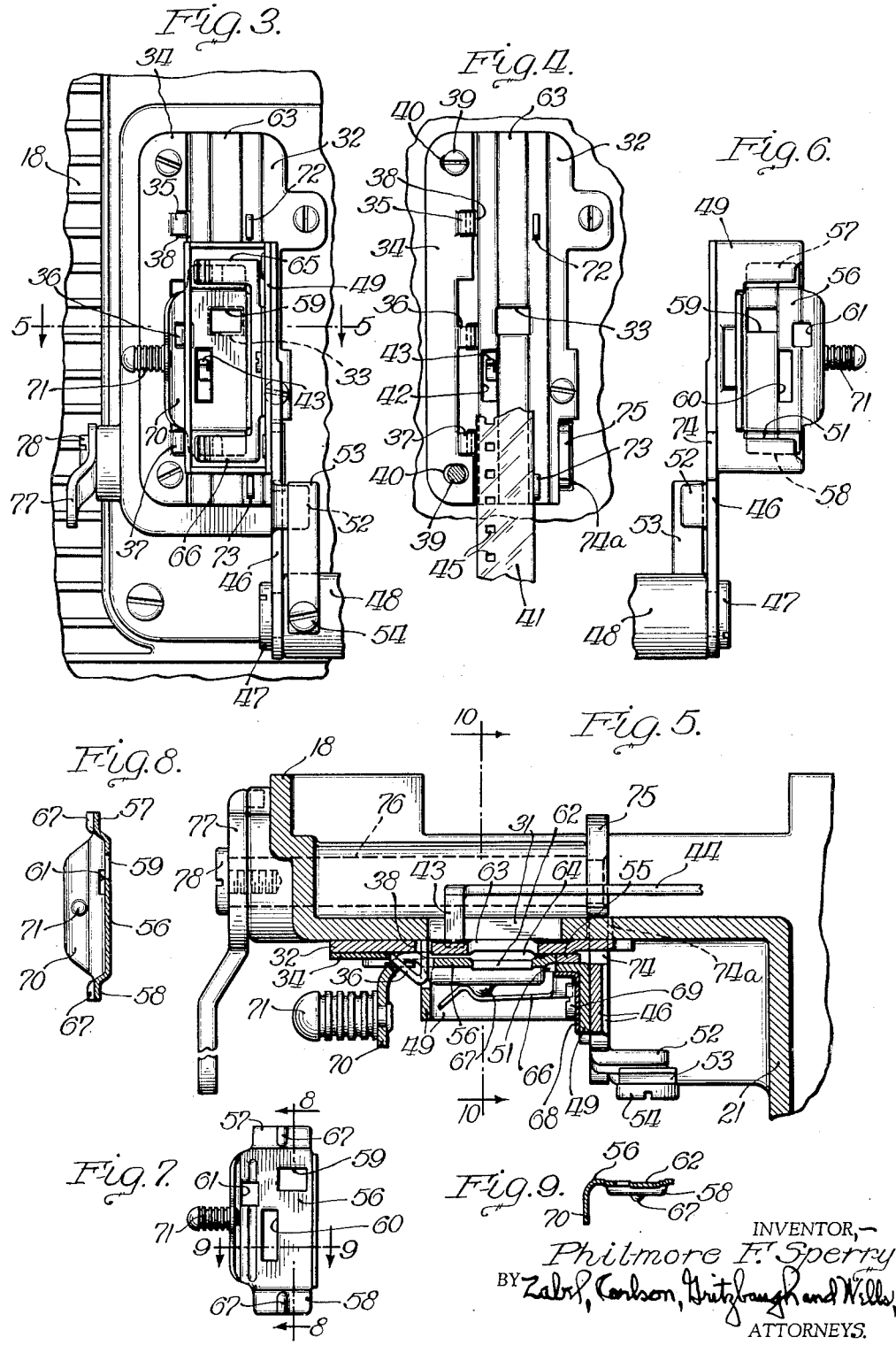
INVENTOR,—
Philmore F. Sperry
BY Zabel, Carlson, Gritzbaugh and Wiles,
ATTORNEYS.

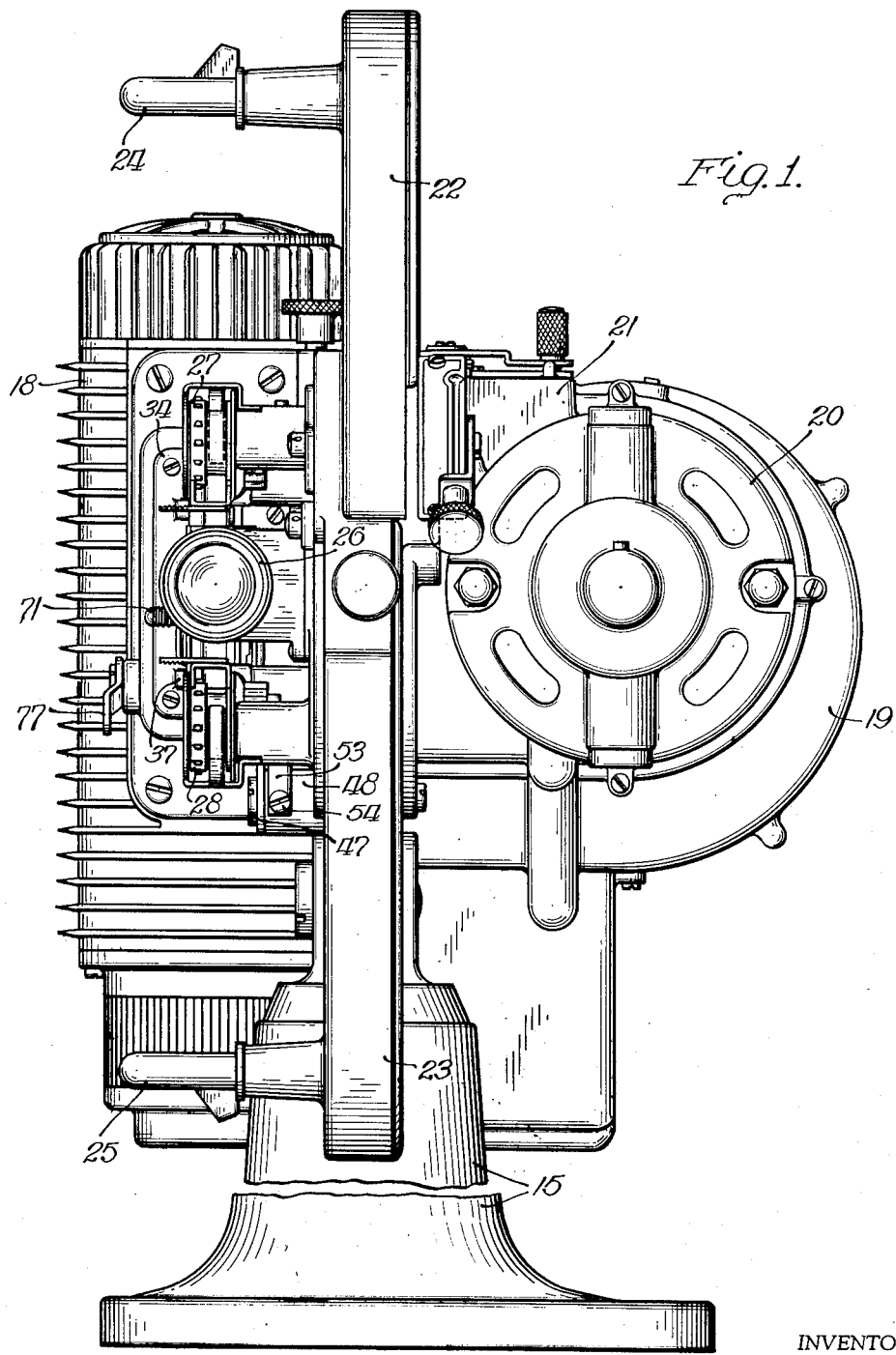

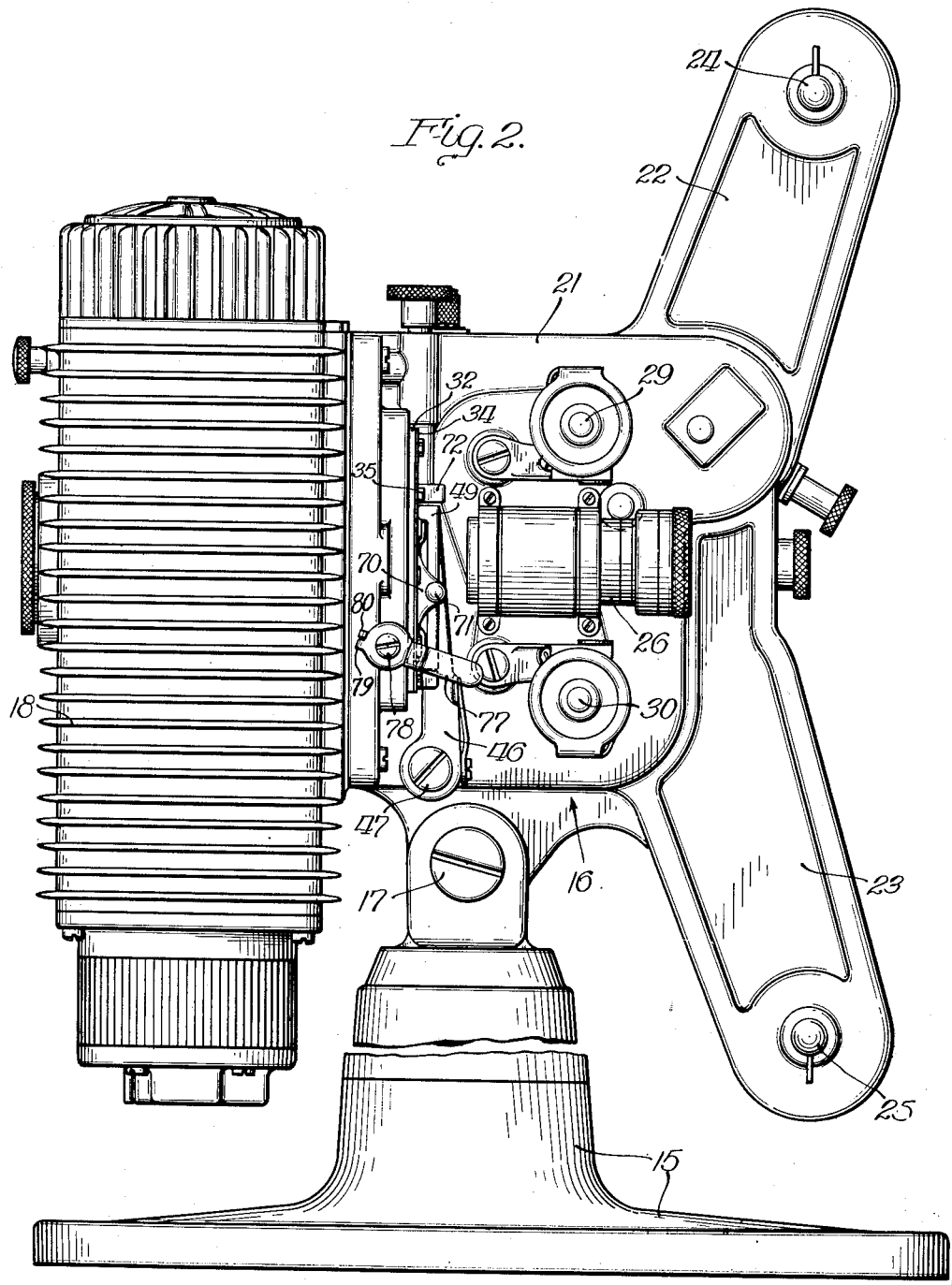

Feb. 25, 1941.   P. F. SPERRY   2,232,811
PROJECTOR AND GATE MECHANISM THEREFOR
Filed Aug. 4, 1939   4 Sheets-Sheet 4
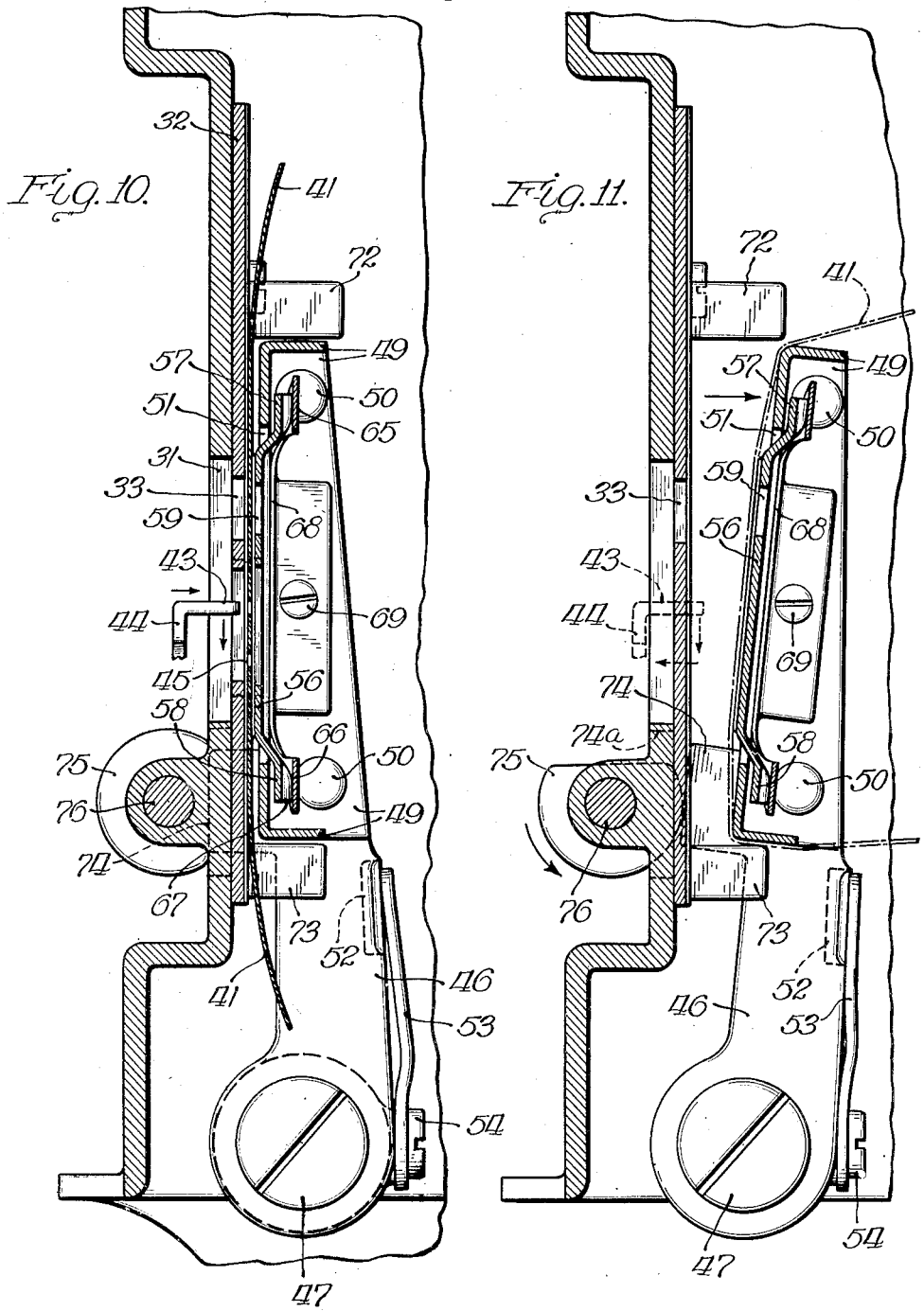
INVENTOR,—
Philmore F. Sperry
BY Zabel, Carlson, Gritzbaugh and Wiles,
ATTORNEYS.

Patented Feb. 25, 1941

2,232,811

UNITED STATES PATENT OFFICE 2,232,811

PROJECTOR AND GATE MECHANISM THEREFOR

Philmore F. Sperry, Chicago, Ill., assignor to Revere Camera Company, Chicago, Ill., a corporation of Delaware Application August 4, 1939, Serial No. 288,296

13 Claims. (Cl. 88—17)

This invention relates to the gate mechanism of a projector or like machine by which a film is held accurately in centered position with respect to the beam of light passing through the projection apertures of two plate-like members between which the film is advanced, and it has for its object the provision of a new and improved form and arrangement of parts by which the film shall be controlled in such manner as to provide for free and easy movement of the film with a minimum of wear on the film and on the gate mechanism parts.

In the improved arrangement as shown by the drawings, the film is passed between an aperture plate rigidly mounted in position and an aperture shoe member which is movably mounted in position. The arrangement is such that the aperture shoe member can be easily and quickly disconnected from the cooperating parts so as to enable it to be cleaned readily from time to time for insuring the desired clean-cut images which are impossible when there is an accumulation of dust or lint about the projection aperture in the shoe. The arrangement further is such that in case the loop in the film should be lost so as to make possible the application of a pull directly on the gate mechanism by the film, the parts are adapted to move against the action of a spring so as to release the film from the film forwarding means and thus prevent any serious damage to the film or to the operating parts in case the film forwarding means should continue in operation. For attaining this result, the aperture shoe member has been pivotally mounted so as to be movable out of operative relation to the stationary aperture plate, and yielding means have been provided for holding the parts normally in operative position and arranged so that a pull on the film in the direction for advancing the film through the gate mechanism serves to move the aperture shoe member out of operative position.

It is another object of this invention to improve mechanisms of this type in sundry details hereinafter pointed out. The preferred means by which these objects have been accomplished are illustrated in the accompanying drawings, in which—

Fig. 1 is a front face view of a projector embodying the invention;

Fig. 2 is a side face view of the projector as seen from the left in Fig. 1;

Fig. 3 is a front face view of the gate mechanism of the projector;

Fig. 4 is a front face view similar to a portion of Fig. 3 but with the aperture shoe member and its associated parts removed, and with a fragmentary portion of a film in position in front of the aperture plate;

Fig. 5 is a horizontal sectional view taken on an enlarged scale at line 5—5 of Fig. 3;

Fig. 6 is a rear face view of the aperture shoe member and the supporting arm upon which it is movably mounted;

Fig. 7 is a front face view of the aperture shoe member removed from its associated parts;

Fig. 8 is a vertical sectional view taken substantially at the line 8—8 of Fig. 7;

Fig. 9 is a horizontal sectional view taken substantially at the line 9—9 of Fig. 7;

Fig. 10 is a vertical sectional view taken substantially at the line 10—10 of Fig. 5; and Fig. 11 is a view similar to Fig. 10 but showing a changed position of certain of the parts.

Referring now to the several figures of the drawings, in which corresponding parts are indicated by the same reference characters, 16 indicates a base member of any suitable type upon which a housing 16 is mounted by means of a pivot pin 17, as is clearly shown in Fig. 2. As is usual in projectors, the housing 16 comprises a lamp housing section 18, a fan housing section 19 having an electric motor 20 extending forwardly therefrom, and a central housing section 21 from which arms 22 and 23 extend obliquely for supporting reels of any suitable type upon shafts 24 and 25 by which one or the other of the reels may be driven by power from the motor 20 by any suitable connections therewith.

In the arrangement shown in the drawings, the beam of light from the lamp in the housing 18 passes forwardly along a path through the gate mechanism and thence through a lens system comprising a housing 26, as best shown in Fig. 2. Above and below the lens housing 26, sprockets wheels 27 and 28 (see Fig. 1) are rotatably mounted in position so as to be driven by shafts 29 and 30 respectively (see Fig. 2).

The parts so far described may be of any approved form and arrangement as is well understood in the art, and it is believed accordingly to be unnecessary to describe such parts further herein.

The improved gate mechanism forming the subject matter of the present application is provided for holding the film in centered position with respect to the beam of light coming from the housing section 18.

As is best shown in Fig. 5, the housing wall at a point directly in front of the lamp housing is provided with an opening 31 in front of which an aperture plate 32 is fixedly mounted, having an opening 33 therein through which the beam of light passes. At the edge portion of the aperture plate 32 at the left in Figs. 3, 4, and 5, a plate 34 is provided having lugs 35, 36, and 37 formed thereon, such lugs being turned backwardly at their free ends so as to extend through openings 38 in the aperture plate, as is best shown in Fig. 5. As is clearly shown in Fig. 4, the plate 34 is adjustably mounted upon the plate 32 by means of machine screws 39 extending through slotted openings 40 in the plate 34 so as to provide for edgewise adjustment of the plate 34 with respect to the plate 32, the lugs 35, 36, and 37 serving as guides for limiting the edgewise movement of the film 41 through the gate mechanism, as will be appreciated from an inspection of Fig. 4. The aperture plate 32 is also provided with a vertically extending slot 42 therein through which the actuating lug 43 of a shuttle arm 44 extends for engagement with the usual openings 45 in the film 41.

Immediately in front of the aperture plate 32, a movable support is provided for an aperture shoe member for cooperation with said aperture plate. In the arrangement shown, the movable support comprises an arm or lever 46 pivotally mounted by means of a machine screw 47 upon a lug 48 carried by the framework, the arm 46 being provided at its upper end portion with a box-like structure 49 which in the arrangement shown is formed of sheet metal bent into shape, being secured in position upon the arm 46 by means of rivets 50. At its rear face, the wall of the box-like structure 49 is cut away at 51, the opening being extended to the side portion also of the structure at the left in Fig. 5. For pressing the arm 46 and the box-like structure 49 backwardly toward the aperture plate 32, a lug 52 is provided upon the arm 46 against which a flat spring 53 bears, such flat spring being secured in position by means of a machine screw 54 secured by screw-threads in the side of the lug 48.

Upon the rear face of the box-like structure 49 at the right in Fig. 5, a strip 55 is welded in position so as to serve as a positioning member with respect to an aperture shoe member 56 slipped into position within the opening 51 from the left in Fig. 5. As is best shown in Fig. 8, the end portions of the aperture shoe member 56 are offset forwardly so as to provide end portions 57 and 58 in the form of flanges. The arrangement is such that the shoe member 56 can be inserted through the opening 51 from the left in Fig. 5 so as to have the intermediate portion of the shoe member extend backwardly through said opening 51, with the flanges 57 and 58 engaging the front face of the back wall of the box-like structure 49 for limiting the backward movement of the shoe member (see Fig. 10). The arrangement is such that an opening 59 through the shoe member 56 registers with the opening 33 through the aperture plate 32, as is clearly shown in Fig. 3. A slot 60 through the shoe member registers with the opening 42 through the aperture plate. An opening 61 is provided through the shoe member for reception of the guide lug 36.

As is best shown in Figs. 5 and 9, the shoe member 56 is offset forwardly at its intermediate portion 62, the aperture plate 32 being offset rearwardly at the portion 63 in corresponding position transversely of the plate, the arrangement being such as to provide a clearance space 64 between the aperture plate and the aperture shoe as is clearly shown in Fig. 5, through which clearance space the picture portion of the film passes.

For holding the aperture shoe member 56 releasably in position within the box-like structure 49, flat springs 65 and 66 are provided adapted by engagement with lugs 67 on the flanges 57 and 58 to hold the shoe member normally pressed backwardly through the opening 51 in the rear wall of said box-like structure. In the arrangement shown, the spring members 65 and 66 are formed integrally with a spring plate 68 secured by means of a machine screw 69 upon the inner face of the side wall of the box-like structure 49. As is clearly shown in Fig. 5, the springs 65 and 66 and the lugs 67 are arranged for enabling them to move readily into and out of operative engagement with each other by a camming action, so that the plate 56 can be readily moved into and out of position in the box-like structure by pressure applied sidewise upon the shoe member. For handling the shoe member 56 to advantage, a flange 70 is provided thereon with a handle 71 extending therefrom.

At the opposite side of the aperture plate 32 from that at which the lugs 35, 36, and 37 are adjustably mounted, there are provided two lugs 72 and 73 (see Fig. 4) against which the opposite edge of a film bears for its movement through the gate mechanism, as is clearly shown in Fig. 4. The lugs 72 and 73 are secured in position by spot welding or in any other suitable manner.

Means is provided for moving the arm 46 and the parts carried thereby toward the right in Fig. 10 about the pivot pin 47 against the action of the spring 53. This means in the arrangement shown comprises a lug 74 carried by the arm 46 and extending rearwardly therefrom into engagement with a cam 75 fixedly mounted upon a shaft 76 so as to rotate therewith, such shaft 76 being journaled in the framework of the housing, as shown in Figs. 5 and 10. As is clearly shown in Fig. 5, the shaft 76 extends outwardly beyond the face of the housing, having an arm or lever 77 fixedly mounted thereon by means of a machine screw 78. The arrangement is such that when the lever 77 stands in substantially horizontal position as shown in Figs. 1 and 2, the lug 74 engages the low portion of the cam 75. When however the handle or lever 77 is swung upwardly from its horizontal position the cam 75 is rotated for forcing the lug 74 and the arm 46 toward the right into the position as shown in Fig. 11 against the action of the spring 53. With the box-like structure 49 and the aperture shoe member 56 pressed forwardly as shown in Fig. 11, the film 41 can be very readily and quickly slipped into position from the left in Fig. 5, whereupon the lever or handle 77 can be turned again to its normal horizontal position for permitting the shoe member 56 and its associated parts to return to normal position, as shown in Fig. 10. With the arm 46 pressed forwardly as shown in Fig. 11, it is an easy matter to remove the aperture shoe member 56 by an easy pull upon the handle 71 so as to release the lug 67 from the springs 65 and 66. When the parts are in operative position as shown in Figs. 5 and 10, the lug 36 serves to prevent removal of the aperture shoe member 56.

As is shown in Fig. 5, the wall of the housing is provided with an opening 74a through which the lug 74 extends for engagement with the cam 75. The movement of the lever or handle 77 in clockwise direction in Fig. 2 is limited by the engagement of a lug 79 on the lever with a lug or pin 80 extending from the face of the wall of the housing, as is best shown in Fig. 2.

With the parts in operative position as shown in Fig. 10, with the film 41 in position for receiving the actuating lug 43 of the shuttle arm 44 in one of the openings 45 of the film, the film is very accurately controlled and its movement is effected very easily. The aperture shoe member 56 is pressed gently toward the aperture plate 32 so as to prevent the film from slipping longitudinally independently of the application of pressure thereon by the shuttle arm 44. Such pressure however is not applied upon the picture portion of the film, by reason of the provision of the clearance 64 as above described.

In case the usual loop or loops should be lost during operation so as to tighten the film 41 between the sprocket wheels 27 and 28, as indicated by the dotted line position of the film in Fig. 11, the resultant pull upon the aperture shoe member 56 by the film results in the movement of such shoe member and its associated parts against the action of the spring 53 into the position as shown in said Fig. 11 so as to carry the film out of engagement with the lug 43 of the shuttle arm 44 so as to prevent injury to the film or to any of the operating parts.

While the form and arrangement of parts as above described are preferred, the invention is not to be limited to the form and arrangement as shown except so far as the claims may be so limited, it being understood that changes might well be made in the form and arrangement of parts without departing from the invention.

I claim:

1. In a mechanism of the type described, the combination of a plate having an opening therethrough, an actuating device movably mounted in front of said plate for drawing a film forwardly away from the plate, means adapted by engagement normally with a film to give the film an intermittent movement and arranged to permit the film to move freely forwardly out of engagement therewith, and a gate mechanism in rear of said actuating device through which the film slides lengthwise normally and movable forwardly with the film by the pull of the film when the film is held against movement with respect to the gate so as to disengage the film from said intermittent movement means.

2. In a mechanism of the type described, the combination of a lamp housing, a sprocket wheel rotatably mounted in front of said lamp housing for drawing a film forwardly away from the housing, means comprising a forwardly extending actuating lug adapted by engagement with the spaced tooth openings through a film to give said film an intermittent movement past said lamp housing, and a gate mechanism in rear of said sprocket wheel adapted normally to hold the film in engagement with said actuating lug and movable forwardly with the film by the pull of the film when the film is held against movement with respect to the gate so as to disengage the film from said actuating lug.

3. In a mechanism of the type described, the combination of a plate having an opening therethrough, an actuating device movably mounted in front of said plate for drawing a film forwardly away from the plate, means adapted by engagement with a film to give the film an intermittent driving movement past said opening in the plate and arranged so as to permit the film to move forward freely out of operative engagement therewith, and a gate mechanism pivotally mounted on a transverse axis in front of said actuating means adapted in its normal position to hold the film in engagement with said actuating means and movable forwardly with the film by the pull of the film when it is held against sliding movement through the gate so as to disengage the film from said actuating means.

4. In a mechanism of the type described, the combination of a plate having an opening therethrough, an actuating device movably mounted in front of said plate for drawing a film forwardly away from the plate, means adapted by engagement with a film to give the film an intermittent driving movement past said opening in the plate and arranged so as to permit the film to move forward freely out of operative engagement therewith, a gate mechanism in rear of said actuating means adapted in its normal rearward position to hold the film in engagement with said actuating means and movable forwardly with the film by the pull of the film when it is held against sliding movement through the gate so as to disengage the film from said actuating means, and yielding means adapted normally by pressure on said gate mechanism to hold said gate mechanism yieldingly in its normal rearward position.

5. In a mechanism of the type described, the combination of a plate having an opening therethrough, an actuating device movably mounted in front of said plate for drawing a film forwardly away from the plate, means adapted by engagement with a film to give the film an intermittent driving movement past said opening in the plate and arranged so as to permit the film to move forward freely out of operative engagement therewith, a gate mechanism pivotally mounted on a transverse axis in rear of said actuating device through which the film is moved lengthwise normally by said driving means and movable forwardly by a pull on the film in case the film is prevented from moving freely lengthwise through the gate mechanism, a flat spring normally urging said gate mechanism backwardly to the limit of its motion, and manually operable means for moving said gate mechanism forwardly against the action of said spring for enabling a film to be moved edgewise from one side into operative position therein.

6. A gate mechanism, comprising in combination an aperture plate fixedly secured in position over an opening in the wall of the projector and having an opening therethrough for the passage of a beam of light, an aperture shoe member in front of said aperture plate having an opening therethrough registering with the opening through said aperture plate and movable toward and from said plate and also movable transversely out of operative position, yielding means normally pressing said shoe member into operative relation to said plate for holding a film by a light friction effect in position between the aperture plate and the aperture shoe member, and means for preventing a film from moving edgewise out of its normal path between said holding members and serving when the shoe member is in its normal operative position to engage the shoe member so as to hold it from movement transversely out of position, and at least one of said holding members being offset outwardly with respect to the other holding member at the intermediate portion of the pathway for the film between said holding members so as to provide clearance between the picture portion of the film and said holding members in its movement between said holding members.

7. A gate mechanism, comprising in combination an aperture plate fixedly secured in position over an opening in the wall of the projector and having an opening therethrough for the passage of a beam of light, an aperture shoe member, an arm movable forwardly and back with respect to said aperture plate, means for supporting said aperture shoe member removably on said arm comprising a lug carried by said aperture plate and engaging an opening in said shoe member so as to hold the shoe member in position on the arm when the arm is in its rearward position but adapted to permit removal of the shoe member when the arm is swung forwardly, said shoe member having an opening therethrough normally held in registration with the opening in said aperture plate for the passage of the beam of light through a film positioned between said aperture plate and said aperture shoe member.

8. A gate mechanism, comprising in combination an aperture plate fixedly secured in position over an opening in the wall of the projector and having an opening therethrough for the passage of a beam of light, a box-like member mounted in front of said aperture plate and having a large opening through its wall at the rear and at one side thereof and movable toward and from said aperture plate, an aperture shoe member movable sidewise through said opening in the box-like member so as to engage the wall of said box-like member at marginal portions of the shoe member, yielding means for pressing said shoe member into releasable holding engagement with the wall of said box-like member, and other yielding means for pressing said box-like member normally backwardly for holding said aperture shoe member in operative position with an opening therethrough for the beam of light registering with the opening through said aperture plate.

9. A gate mechanism, comprising in combination an aperture plate fixedly secured in position over an opening in the wall of the projector and having an opening therethrough for the passage of a beam of light, an arm pivotally mounted in front of said aperture plate so as to be adapted to swing toward and from said aperture plate, a box-like member carried by said arm in front of said aperture plate having a large opening through its wall at the rear and at one side portion thereof, an aperture shoe member movable sidewise through said opening in the box-like member so as to engage the wall of said box-like member at a plurality of marginal points, yielding means for pressing said shoe member lightly into engagement with the wall of the box-like member, and a spring adapted by engagement with said arm to press said box-like member and said shoe member backwardly into operative position with an opening through the shoe member for the beam of light registering with the opening through said aperture plate.

10. A gate mechanism, comprising in combination an aperture plate fixedly secured in position over an opening in the wall of the projector and having an opening therethrough for the passage of a beam of light, an arm pivotally mounted in front of said aperture plate so as to be adapted to swing toward and from said aperture plate, a box-like member carried by said arm in front of said aperture plate having a large opening through its wall at the rear and at one side portion thereof, an aperture shoe member movable sidewise through said opening in the box-like member and having forwardly offset end flange portions adapted to engage the front face of the wall of said box-like member above and below said opening, spring means carried by said box-like member adapted by engagement with said end flange portions of said shoe member to hold the shoe member releasably in position and to press it lightly into engagement with the rear wall portion of said box-like member, and a spring adapted by engagement with said arm to press said box-like member and said shoe member backwardly into operative position with an opening through the shoe member for the beam of light registering with the opening through said aperture plate.

11. A gate mechanism, comprising in combination an aperture plate fixedly secured in position over an opening in the wall of the projector and having an opening therethrough for the passage of a beam of light, an arm pivotally mounted in front of said aperture plate so as to be adapted to swing toward and from said aperture plate, a box-like member carried by said arm in front of said aperture plate having a large opening through its wall at the rear and at one side portion thereof, an aperture shoe member movable sidewise through said opening in the box-like member and having forwardly offset end flange portions adapted to engage the front face of the wall of said box-like member above and below said opening, laterally extending springs carried by said box-like member adapted by engagement with said end flange portions of said shoe member to hold the shoe member releasably in position and to press it lightly into engagement with the rear wall portion of said box-like member, and yielding means normally urging said box-like member and said shoe member backwardly into operative position with an opening through the shoe member for the beam of light registering with the opening through said aperture plate.

12. A gate mechanism, comprising in combination an aperture plate fixedly secured in position over an opening in the wall of the projector and having an opening therethrough for the passage of a beam of light, an aperture shoe member in front of said aperture plate having an opening therethrough registering with the opening through said aperture plate and movable toward and from said plate, yielding means normally pressing said shoe member into operative relation to said plate for holding a film by a light friction effect in position between the aperture plate and aperture shoe member, a second plate adjustable transversely on said aperture plate, and means for preventing a film from moving edgewise out of its normal path between said holding members comprising a plurality of lugs carried by said second plate and adjustable transversely therewith.

13. A gate mechanism, comprising in combination an aperture plate fixedly secured in position over an opening in the wall of the projector and having an opening therethrough for the passage of a beam of light, an aperture shoe member, means for supporting said shoe member in front of said aperture plate with an opening therethrough in registry with the opening through said aperture plate for the beam of light and movable for carrying said shoe member toward and from the front face of said aperture plate and adapted to be readily detached from said shoe member by a transverse movement of the shoe member with respect thereto, yielding means normally pressing said shoe member into operative relation to said aperture plate for holding a film by a light friction effect in position between the aperture plate and the aperture shoe member, and means for preventing a film from moving edgewise out of its normal path between said holding members comprising a lug carried by said aperture plate and adjustable transversely with respect thereto, said lug serving also to prevent movement of said aperture shoe member out of operative engagement with said yielding means while said shoe member stands in its rearmost position adjacent to said aperture plate.

PHILMORE F. SPERRY.